United States Patent
Yamamoto et al.

(10) Patent No.: US 7,791,645 B2
(45) Date of Patent: Sep. 7, 2010

(54) IMAGING SYSTEM AND SYSTEM CONTROL METHOD

(75) Inventors: Mihoko Yamamoto, Kanagawa (JP); Kumiko Sera, Tokyo (JP); Hiroyuki Tominaga, Kanagawa (JP); Tetsuhisa Araki, Saitama (JP)

(73) Assignee: Sony Corporation (JP)

( * ) Notice: Subject to any disclaimer, the term of this patent is extended or adjusted under 35 U.S.C. 154(b) by 515 days.

(21) Appl. No.: 11/434,477

(22) Filed: May 15, 2006

(65) Prior Publication Data

US 2006/0279627 A1  Dec. 14, 2006

(30) Foreign Application Priority Data

May 16, 2005 (JP) .............. P2005-142753

(51) Int. Cl.
*H04N 5/232* (2006.01)
*H04N 7/18* (2006.01)

(52) U.S. Cl. ............................. 348/211.4; 348/159
(58) Field of Classification Search .......... 348/159, 348/211.2, 211.4, 211.8, 211.9
See application file for complete search history.

(56) References Cited

U.S. PATENT DOCUMENTS 7,468,747 B2 * 12/2008 Nakamura et al. .......... 348/239

| | | | |
|---|---|---|---|
| 2002/0026289 A1 * | 2/2002 | Kuzunuki et al. | ........... 702/150 |
| 2004/0109199 A1 | 6/2004 | Tsubaki | |
| 2006/0132605 A1 * | 6/2006 | Watanabe et al. | ........... 348/159 |

FOREIGN PATENT DOCUMENTS

| EP | 1168715 | 1/2002 |
|---|---|---|
| JP | 2002-015215 A | 1/2002 |
| JP | 2003-274640 | 9/2003 |
| JP | 2004-070614 A | 3/2004 |
| JP | 2004-193819 | 7/2004 |
| JP | 2004-193819 A | 7/2004 |
| JP | 2005-107886 A | 4/2005 |

* cited by examiner

*Primary Examiner*—Lin Ye
*Assistant Examiner*—Dillon Durnford-Geszvain
(74) *Attorney, Agent, or Firm*—Lerner, David, Littenberg, Krumholz & Mentlik, LLP

(57) ABSTRACT

An imaging system includes plural portable terminals managed by a server; and the portable terminal to be imaged is notified that an imaging operation has been performed on a portable terminal which can communicate with a facility camera through a camera-terminal network. The notification is also provided to portable terminals belonging to the same group as the portable terminal.

8 Claims, 12 Drawing Sheets

IMAGING SYSTEM AND SYSTEM CONTROL METHOD

CROSS-REFERENCE TO RELATED APPLICATIONS

The present application claims priority from Japanese Patent Application No. JP 2005-142753 filed on May 16, 2005, the disclosure of which is hereby incorporated by reference herein.

BACKGROUND OF THE INVENTION

The present invention relates to an imaging system including an imaging device and a system control method for controlling the operations of the imaging system.

Japanese Patent Laid-Open No. 2004-193819 proposes an imaging system, in which an imaging device is installed at a specific point to image guests in a facility such as a theme park, image data obtained by imaging the guests is, for example, printed out, and printed images can be distributed to the guests later.

SUMMARY OF THE INVENTION

The present invention is also applied to an imaging system for distributing to guests images which are obtained by imaging the guests by means of imaging devices installed in a facility such as a theme park. There is a need for an imaging system which can provide more entertainment for guests.

In consideration of the need, the imaging system according to an embodiment of the present invention is configured as follows:

First, the imaging system of this embodiment includes terminals provided for respective moving subjects, an imaging device, and a managing device.

The managing device includes managing means that manages a plurality of specific terminals in a group; first communication means that conducts wireless communications with directivity between the imaging device and at least one terminal in a group within a coverage area of short range physical communication; second communication means that conducts wireless communications between the at least one terminal and the managing device; third communication means that conducts wireless communications between the imaging device and the managing device; imaging means that performs an imaging operation by which the imaging device can obtain photographic image data in an imaging field of view corresponding to the coverage area of the first communication means in a state in which communications are enabled between the imaging device and the at least one terminal through the first communication means; and notifying means that causes both a subject terminal and a non-subject terminal or only the non-subject terminal to issue a notification that the imaging means has performed or is about to perform the imaging operation, the subject terminal serving to communicate with the imaging device through the first communication means, the non-subject terminal serving as a predetermined one or more of the terminals other than the subject terminal and belonging to the same group as the subject terminal.

In this configuration, the non-subject terminal belonging to the same group is notified that the imaging device has performed or is about to perform the imaging operation on the terminal (subject terminal).

Since the non-subject terminal is notified thus, the imaging system can be used with enhanced entertainment and convenience as compared with the case where, for example, only the subject terminal is notified.

BRIEF DESCRIPTION OF THE DRAWINGS

Embodiments of the present invention will be described in detail based on the following figures, wherein.

DETAILED DESCRIPTION

The following will describe the preferred embodiment (hereinafter also referred to as an embodiment) for implementing the present invention.

Figure 1:
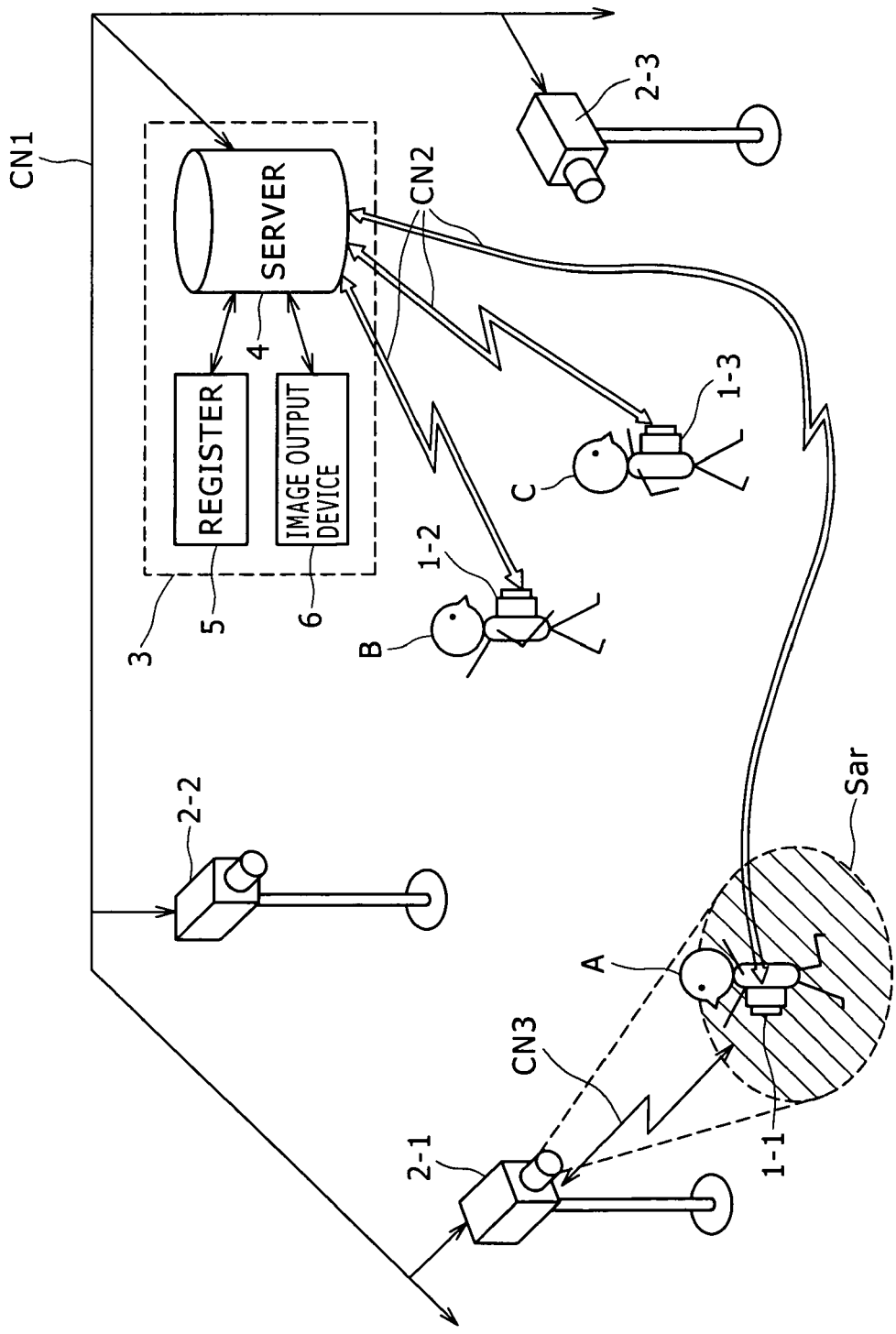
FIG. 1 is a diagram schematically showing an example of an imaging system according to an embodiment of the present invention.

FIG. 1 schematically shows the system configuration of an imaging system according to the present embodiment. In this case, the imaging system of the present embodiment is used in an amusement facility such as a theme park and an amusement park.

As shown in FIG. 1, the imaging system of the present embodiment mainly includes portable terminals 1, facility cameras 2, and a management center 3 including a server 4. The portable terminal 1 corresponds to the terminal of the present invention, the facility camera 2 corresponds to the imaging device of the present invention, and the server 4 in the management center 3 corresponds to the managing device of the present invention.

The portable terminal 1 is carried by each guest (subject) in an amusement facility. For example, the portable terminal 1 is lent from the management of the amusement facility. FIG. 1 shows guests A, B and C who carry portable terminals 1-1, 1-2, and 1-3, respectively. The portable terminals 1 are lent mainly to enable the guests to be imaged by the facility cameras 2 as will be described later.

The facility camera 2 is an imaging device properly installed at a point where guests are preferably photographed in the amusement facility. For example, the facility camera 2 can image guests in the imaging field of view which includes an imaging area Sar corresponding to an installation state, and generate photographic image data of photographic images.

The management center 3 is a unit for exercising general control over the imaging system of the present embodiment and includes, for example, the server 4, a register 5, and an image output device 6 as shown in FIG. 1.

The register 5 includes, for example, hardware such as a computer. The register 5 processes input for registering guests who use the portable terminals 1, and transmits input information to the server 4.

The image output device 6 is a device such as a printer for printing out photographic image data stored in the server 4 as will be described later.

The portable terminals 1, the facility cameras 2, and the server 4 of the management center 3 constitute the imaging system and communicate with one another through three communications networks (intra-facility network CN1, facility-terminal network CN2, and camera-terminal network CN3) each of which enable communications with the predetermined devices.

First, the intra-facility network CN1 is a network for communications between the server 4 and all the facility cameras 2 installed in the amusement facility. The network may be a wireless communications network or a wire communications network. Both of wireless and wire communications may be provided.

The facility-terminal network CN2 is a network for wireless communications between the server 4 and the portable terminals 1. A communication distance (communication range) is set so as to enable communications between the server 4 and the portable terminals 1 in the amusement facility.

The camera-terminal network CN3 is a network for short range wireless communications between one of the facility cameras 2 and the portable terminal 1.

Regarding the communication range of the facility camera 2 in the camera-terminal network CN3, directivity is set so as to enable communications with the portable terminal 1 positioned in the imaging area Sar corresponding to the imaging field of view set for the facility camera 2. The communication distance is set at a predetermined short distance (for example, about several to more than ten meters).

In other words, the camera-terminal network CN3 is placed within the imaging field of view of the facility camera 2 and enables communications between the facility camera 2 and the portable terminal 1 at a certain short distance. This means that when a guest who carries the portable terminal 1 comes within a certain distance from the facility camera 2 in the imaging field of view, communications are enabled between the portable terminal 1 and the facility camera 2.

An actual communication mode for implementing these communications networks is not particularly limited. Various modes of cable LAN and wireless LAN are currently available for the intra-facility network CN1 and various modes of wireless LAN are available for the facility-terminal network CN2. For example, even when the same wireless LAN standard is used for the intra-facility network CN1 and the facility-terminal network CN2, interference between the intra-facility network CN1 and the facility-terminal network CN2 is prevented by carrying out multicast and unicast communications.

Further, wireless LAN can be used for the camera-terminal network CN3. Bluetooth, UWB (Ultra Wide Band) and others may be also used.

Referring to FIG. 1, the following will discuss the way to use the imaging system configured thus.

The portable terminals 1 are lent to guests from the management of the amusement facility for a charge or free of charge. The three guests A, B and C shown in FIG. 1 are, for example, friends who visit the amusement park together. The guest A, B and C enter the amusement park and decided to borrow the portable terminals 1. When the guests A, B and C apply for the lending of the portable terminals 1-1, 1-2, and 1-3, the register 5 conducts registration such that the portable terminals 1-1, 1-2, and 1-3 correspond to the guests A, B and C, respectively. Since the guests A, B and C are friends of a group, the three portable terminals 1-1, 1-2 and 1-3 lent to the guests A, B and C are registered to be managed as a group.

The portable terminals 1 are registered by the register 5 through, for example, input to a computer. Input can be made in various ways. For example, a staff member of the amusement facility may input necessary items including a number (terminal) assigned to the portable terminal 1. Alternatively an IC tag attached to the portable terminal 1 or an IC tag attached to the ticket of the guest may be read by a reader to input and capture necessary information.

The guests A, B and C having completed registration go around the amusement facility with the portable terminals 1-1, 1-2 and 1-3.

In this case, a place where the guests are photographed by the facility camera 2 is, for example, a characteristic place which is attractive to the guests in the amusement facility and suitable for a commemorative photograph. The portable terminals 1 are lent to the guests mainly for the purpose of guiding the guests to a place (imaging area Sar) where photographing and imaging are performed by the facility camera 2. Accordingly the portable terminal 1 has a display section on which a guide image such as a map for guiding the guest to an imaging area can be displayed in a predetermined display mode. The guest views the guide image and moves in the facility while searching for a desired imaging area. In this case, the photographs of images having been picked up in the imaging area Sar are edited as an album and distributed to the guests.

The imaging area Sar is a physical space or a range of positions, which is generated by limiting the range of the positions of a subject in order to photograph a main subject (guest) in a proper composition in the field of view falling almost within the frame of a photographic image of the corresponding facility camera 2. In other words, imaging spots are the range of the standing positions of guests who are imaged and photographed by the facility camera 2.

In this case, the guest A separates from the guests B and C. The guest A separates from the guests B and C because the guest A wishes to be photographed alone in the imaging area Sar corresponding to the facility camera 2-1.

While moving in the facility according to a guide image displayed on the portable terminal 1-1, the guest A comes within a certain distance from the imaging area Sar corresponding to the facility camera 2-1.

As described above, regarding the facility camera 2-1, the directivity of communications and a communication distance are set according to the imaging area Sar corresponding the facility camera 2-1. As the guest. A comes close to the imaging area Sar corresponding to the facility camera 2-1, the portable terminal 1-1 carried by the guest A falls within the communication range of the facility camera 2-1. Thus communications between the portable terminal 1-1 and the facility camera 2-1 are newly established through the camera-terminal network CN3.

In the present embodiment, when communications are newly established thus between the portable terminal 1 and the facility camera 2, predetermined device operations are performed to correctly guide the guest who carries the portable terminal 1 to the imaging area Sar (to notify the guest of the location of the imaging area).

Some patterns are available for the guiding operation and examples of the guiding operation will be discussed below. For example, at least one of the examples is adopted or two or more of the examples are combined.

In the first example, the imaging area Sar where the guest stands is illuminated by a lighting device when the imaging area Sar is dark.

Alternatively, a sound output from the portable terminal 1 notifies the guest of the presence of the imaging area Sar. For example, a short beeping electronic sound is intermittently output and a time interval between output electronic sounds is changed according to a distance from the imaging area Sar. For example, as the guest comes closer to the imaging area Sar, the time interval between output electronic sounds is shortened.

Alternatively, an LED (Light Emitting Diode) included in the portable terminal 1 is blinked and a time interval between blinks is changed according to a distance from the imaging area Sar.

Alternatively, a vibrator included in the portable terminal 1 is intermittently operated and a time interval between vibrations is changed according to a distance from the imaging area Sar.

Alternatively, the display section included in the portable terminal 1 displays a distance from the imaging area Sar in a predetermined display mode.

Alternatively, a moving photographic image (monitor image) photographed at that time by the facility camera 2 is transmitted to the portable terminal 1 through the camera-terminal network CN3. The received monitor image is displayed on the portable terminal 1. The guest who carries the portable terminal 1 compares the displayed monitor image and the surroundings of the guest to search for a location where the guest can be positioned in the field of view corresponding to the monitor image.

For example, the guest A follows the guide provided thus, so that the guest A can be correctly positioned in the imaging area Sar of the facility camera 2-1 and can be imaged as a main subject by the facility camera 2-1 in a predetermined composition. When the system decides that this state is present as will be described later, the system performs an imaging operation.

In the present embodiment, before the imaging operation, the guest A who carries the portable terminal 1-1 is notified that the imaging operation is about to be performed.

In the notifying operation, the guest A may be notified that the imaging operation is about to be performed. In the present embodiment, the guest A is notified of the time when the photographing operation will be actually performed.

The same operation as the guidance to the imaging area Sar can be applied to the notification of the time of imaging.

In other words, a sound outputted from the portable terminal 1 notifies the guest A of the time of imaging. For example, a short beeping electronic sound is intermittently output. As the guest A comes close to the time of imaging, a time interval between output electronic sounds is shortened.

Alternatively, the LED included in the portable terminal 1 is blinked. As the guest A comes close to the time of imaging, a time interval between blinks is shortened.

Alternatively, the vibrator included in the portable terminal 1 is intermittently operated. As the guest A comes close to the time of imaging, a time interval between vibrations is shortened.

Alternatively, a time before the time of imaging is displayed in a predetermined display mode on the display section included in the portable terminal 1. In addition to such display, a monitor image imaged by the facility camera 2 is also displayed, so that the state of the imaged guest can be easily recognized. At this moment, guidance for imaging the guest in the best composition, for example, a message that "You are at the photo point of . . . . Let's take a picture with . . . ." may be displayed or output as a sound together with the time of imaging.

While the guest is notified of the time of imaging, auto-focus may be performed in, for example, the facility camera 2-1 to obtain a properly focused state where the guest as a main subject is focused. A technique for achieving auto-focus may be a known technique including the contrast method.

Further, when the LED, the vibrator, a sound or the like is used for notification of the time of imaging, notifying means is preferably different from means for guidance to the imaging area Sar. For example, when the LED is used for the guidance, the vibrator or a sound is preferably used for the notification of the time of imaging. When the guidance and notification are provided in the same way, it may be difficult to recognize whether the guest is guided to the imaging area or notified of the time of imaging.

When the guest is notified of the time of imaging thus and reaches the time, the facility camera 2-1 performs the imaging operation. Since the guest A is positioned in the imaging area Sar at this moment, the guest A is imaged without being placed out of the predetermined composition. Further, since the guest A has been notified of the time of imaging in the above manner, the guest A can pose for the time of imaging without being suddenly photographed. Thus the guest can easily obtain a desired photographic image with no useless images.

When the imaging operation is performed by the facility camera 2-1, an image data file is generated in the facility camera 2-1. The image data file includes photographic image data generated from photographic images. A structural example of the image data file will be described later. The image data file is made up of static image data which is generated from photographic images with a predetermined resolution in a predetermined format and a header which includes necessary information such as a file ID and the terminal ID of the portable terminal 1 having been communicated through the camera-terminal network CN3 during imaging. However, under the concept of the present invention, the photographic image data in the image data file may be moving image data, and photographic image data serving as moving images can be generated based on the configuration of the facility camera 2-1 (described later).

Then, the facility camera 2-1 transmits the generated image data file to the portable terminal 1-1 through the camera-terminal network CN3, and transmits the photographic image data to the server 4 through the intra-facility network CN1.

The portable terminal 1-1 having received the image data file from the facility camera 2-1 stores the received image data file therein. Moreover, the portable terminal 1-1 displays the photographic image data of the received image data file on its display section. When viewing the displayed photographic image data, the guest A can confirm the completion of imaging in the imaging area Sar of the facility camera 2-1 as well as a photographing result.

The server 4 having received the image data file from the facility camera 2-1 stores the image data file therein. Further, the server 4 is caused to transmit notification information to the portable terminals 1-2 and 1-3 carried by the guests B and C of the same group as the guest A to notify that the guest A (portable terminal 1-1) has been imaged by the facility camera 2-1. The portable terminals 1-2 and 1-3 having received the notification perform a notifying operation in a predetermined output mode so as to notify the users (guests B and C) who carry the portable terminals 1-2 and 1-3 that the guest A has been imaged by the facility camera 2-1.

In the notifying operation of the present embodiment, the photographic image of the guest A having been photographed by the facility camera 2-1 is displayed on the display sections of the portable terminals 1-2 and 1-3. The notification is provided by, for example, displaying a message that "Mr./Mrs. . . . (guest A) has been photographed at . . . (the imaging area Sar of the facility camera 2-1)" or outputting the sound of the message.

For such a notification, when transmitting the notification information to the portable terminals 1-2 and 1-3, the server 4 transmits to the portable terminals 1-2 and 1-3 the notification information including the image data file having been transmitted from the facility camera 2-1. The portable terminals 1-2 and 1-3 display the photographic image data from the transmitted image data file. Further, the portable terminals 1-2 and 1-3 can store therein the image data file having been transmitted thus. The message of characters or a sound is outputted as follows: the name of the guest A is identified from, for example, terminal management information or the like stored in the server 4, the location corresponding to the facility camera 2 having transmitted the image data file is specified, and display character data or a synthesized sound is generated as a message based on the specified information.

In this notification pattern, the guest who carries the portable terminal 1 may frequently fail to find the displayed image. Thus the notification is preferably combined with a sound, the driving of the vibrator, and the blinking and lighting of the LED.

According to the present embodiment, when one of the plurality of portable terminals 1 forming one group can communicate with the facility camera 2 and an imaging operation is performed, the other portable terminals 1 belonging to the same group are also notified of the completion of imaging. Therefore entertainment is enhanced more than the case where only the portable terminal 1 imaged by the facility camera 2 is notified of the completion of imaging.

For example, in the amusement facility of the present embodiment, a plurality of guests in a group may move in two or more groups. In this case, when a member of the same group is imaged in an imaging area Sar far away from the other members and the other members are notified of the completion of imaging, the other members can recognize the surroundings of the imaged member, thereby enhancing entertainment. Additionally in the present embodiment, the notification of the completion of imaging in the imaging area Sar involves the display of a photographic image, thereby further enhancing entertainment.

According to the above explanation, the portable terminal 1 of the present embodiment stores at least the image data file of a photographic image having been photographed by the facility camera 2 for a guest who carries the portable terminal 1 or the image data file of a photographic image having been photographed by the facility camera 2 for another guest who belongs to the same group and carries the portable terminal 1.

The portable terminal 1 of the present embodiment can display, in response to a predetermined operation, a list of image data files stored thus. For example, the contents of the photographic image data included in the image data files stored in the portable terminal 1 are displayed as a list of thumbnail images. For example, user interface display for designating each thumbnail image (image data file) as a photograph necessary for an album to be distributed to the user is provided in a predetermined display mode.

Thus the guest causes the portable terminal 1 carried by the guest to display the list, and the guest designates (places a checkmark) a photograph to be included in an album while viewing the displayed images. Various GUI (Graphical User Interface) configurations are available for this operation. Check boxes are displayed so as to correspond to the thumbnail images and a checkmark is placed on the checkbox of a thumbnail image to be included in an album. And then the portable terminal 1 transmits, to the server 4 through the facility-terminal network CN2, a command for requesting the registration of an image data file having been designated to be included in the album.

As described above, the server 4 receives and stores the image data files having been obtained by the imaging operation of the facility camera 2. In response to the reception of the registration requesting command having been transmitted thus, the server 4 manages the portable terminal 1 (guest) having transmitted the command and the requested image data file while establishing correspondence between the portable terminal 1 and the image data file.

For example, when leaving the amusement facility, the guest is given a photo album for a charge or free of charge. The photo album is a collection of photographs printed from image data files (photographic image data) having been registered by the guest from the list display.

An operation such as a printing operation, in which image data is output as photographs to produce an album, involves interfacing between the server 4 and the image output device 6. To be specific, for example, when a photographic album is provided for the guest A, the ID of the guest A (for example, the ID of the portable terminal 1 lent to the guest A) is input to the image output device 6. The server 4 selects an image data file corresponding to the input ID from stored image data files and transmits the image data file to the image output device 6. The image output device 6 prints out, for example, the photographic images of the image data file having been transmitted from the server 4 to produce a photographic album. Then the finally produced photographic album is given to the guest A. Instead of the photographic album, the image data file (photographic image data) may be stored in a predetermined medium and given to the guest.

The portable terminal 1 of this case may be provided with the function of an imaging device such as a digital still camera (or digital video camera). In this case, image data (image data file) obtained by the imaging operation of the portable terminal 1 can be also stored in the portable terminal 1. In the amusement facility, the guest can use, like ordinary cameras, the portable terminal 1 carried by the guest and enjoy photo and video shooting. Images photographed (imaged) by the portable terminal 1 are also given to the guest, for example, as an album or images stored in a medium.

Further, an image data file (photographic image data) having been imaged and stored by the portable terminal 1 may be transmitted and received through communications between the portable terminals 1 and may be stored also in the portable terminal 1 at the other end. Therefore, when a member asks a member of the other group to take a picture, it is not necessary to pass the camera. A photograph is first taken by the portable terminal carried by the member of the other group and then transmitted to the other end, so that the picture of the member at the other end can be stored in the portable terminal 1 at the other end.

The following will describe an example of a technical structure for implementing the system operation of FIG. 1.

Figure 2:
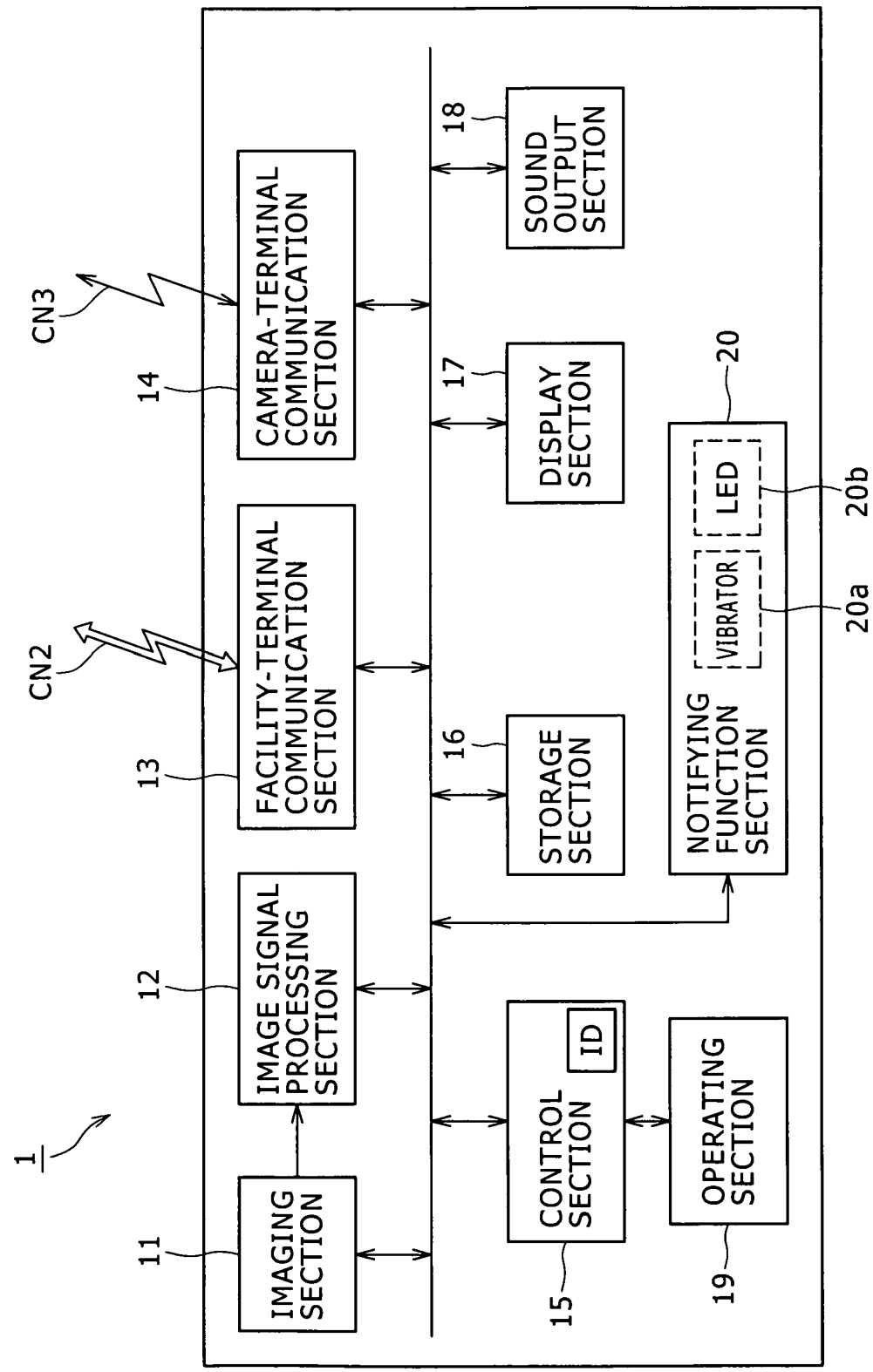
FIG. 2 is a block diagram showing a structural example of a portable terminal.

FIG. 2 is a block diagram showing a structural example of the portable terminal 1.

The portable terminal 1 of FIG. 2 includes an imaging section 11. The imaging section 11 includes, for example, an optical system for imaging and image pickup devices such as a CCD and a CMOS sensor. Photographic image light obtained from the optical system is converted to an electric signal by the image pickup device and output to an image signal processing section 12.

In the image signal processing section 12, the electric signal of the input photographic image light is subjected to predetermined processing such as gain correction and converted to a digital signal. After that, digital image signal processing including predetermined encoding/decoding is performed on the signal.

For example, a photographic image is generated as a digital image data file in a predetermined format by encoding. The digital image data file generated thus can be transferred through, for example, a data bus according to the control of a control section 15 and stored in a storage section 16. In the case where the digital image data file stored in the storage section 16 is displayed on a display section 17, the image signal processing section 12 performs necessary decoding corresponding to the encoding method and the image data is transferred to the display section 17. And then, the image of the input image data is displayed on the display section 17.

A facility-terminal communication section 13 is a part including a hardware device for enabling communications through the facility-terminal network CN2. The facility-terminal network CN2 enables wireless communications between the server 4 and the portable terminal 1 in the amusement facility, and the facility-terminal communication section 13 is configured so as to enable such wireless communications.

A camera-terminal communication section 14 is a part for enabling communications through the camera-terminal network CN3. The operations of the communication sections are also controlled by the control section 15. As described above, the camera-terminal network CN3 enables short range wireless communications between one of the facility cameras 2 and the portable terminal 1 positioned in the directional range of the facility camera 2, and the camera-terminal communication section 14 is configured in response to such communications.

The control section 15 is configured as, for example, a microcomputer which includes a CPU (Central Processing Unit), ROM and RAM and performs kinds of control processing in the portable terminal 1. For example, the CPU runs programs stored in the ROM in reality, so that the control processing of the control section 15 can be achieved.

It is assumed that each of the portable terminals 1 is provided with a unique ID (terminal ID). The terminal IDs are stored in the ROM, so that the terminal IDs are stored in the control section 15.

As described above, the storage section 16 is a part for storing image data files and so on. The specific configuration of the storage section 16 should not be particularly limited but a rewritable device is preferably used. At present, a nonvolatile memory device such as a flash memory and an HDD (hard disk drive) are available. For example, the storage section 16 may be unexchangeable one fixed in the portable terminal 1 and may include a predetermined removable storage medium and a drive corresponding to the storage medium.

The display section 17 is a part including a predetermined display device. The display section 17 is driven according to the control of the control section 15 to display an image. Since the display section 17 of the present embodiment displays a photographic image, a display device capable enough to display a photographic image is preferably used. At present, a liquid crystal display or the like is available.

A sound output section 18 is a part for outputting, for example, an electronic sound synthesized by the control section 15 or a synthesized human voice. Through the data bus to the sound output section 18, the control section 15 transfers, for example, the data of a sound (audio signal data) to be output from the sound output section 18. The sound output section 18 receives the transferred audio signal data, amplifies the data through DA conversion or the like, and finally outputs the data as a sound through speakers.

In this case, an operation section 19 collectively indicates operating elements included in the portable terminal 1 and an operation information signal output part which generates and outputs an operation information signal in response to the operations of the operating elements. When the display screen of the display section 17 is a touch panel, the configuration of the touch panel is also included in the operation section 19.

The operation information signal generated in response to the operations of the operating elements and the like which make up the operation section 19 is input to the control section 15. The control section 15 performs necessary control processing in response to the input operation information signal.

A notifying function section 20 is a part having the function of notifying the user of a matter to be notified, through means except for display on the display section 17 and a sound output from the sound output section 18. In the present embodiment, for example, a vibrator 20*a* or an LED 20*b* is provided.

The notifying operation of the notifying function section 20 is controlled by the control section 15. For example, when the vibrator 20*a* is operated as the notifying function section 20, the control section 15 outputs a control signal for vibrating the vibrator 20*a* according to the way to vibrate the vibrator 20*a*. In response to the control signal, a motor for the vibrator is driven by the vibrator 20*a*, so that the vibrator 20*a* operates to vibrate.

Figure 3:
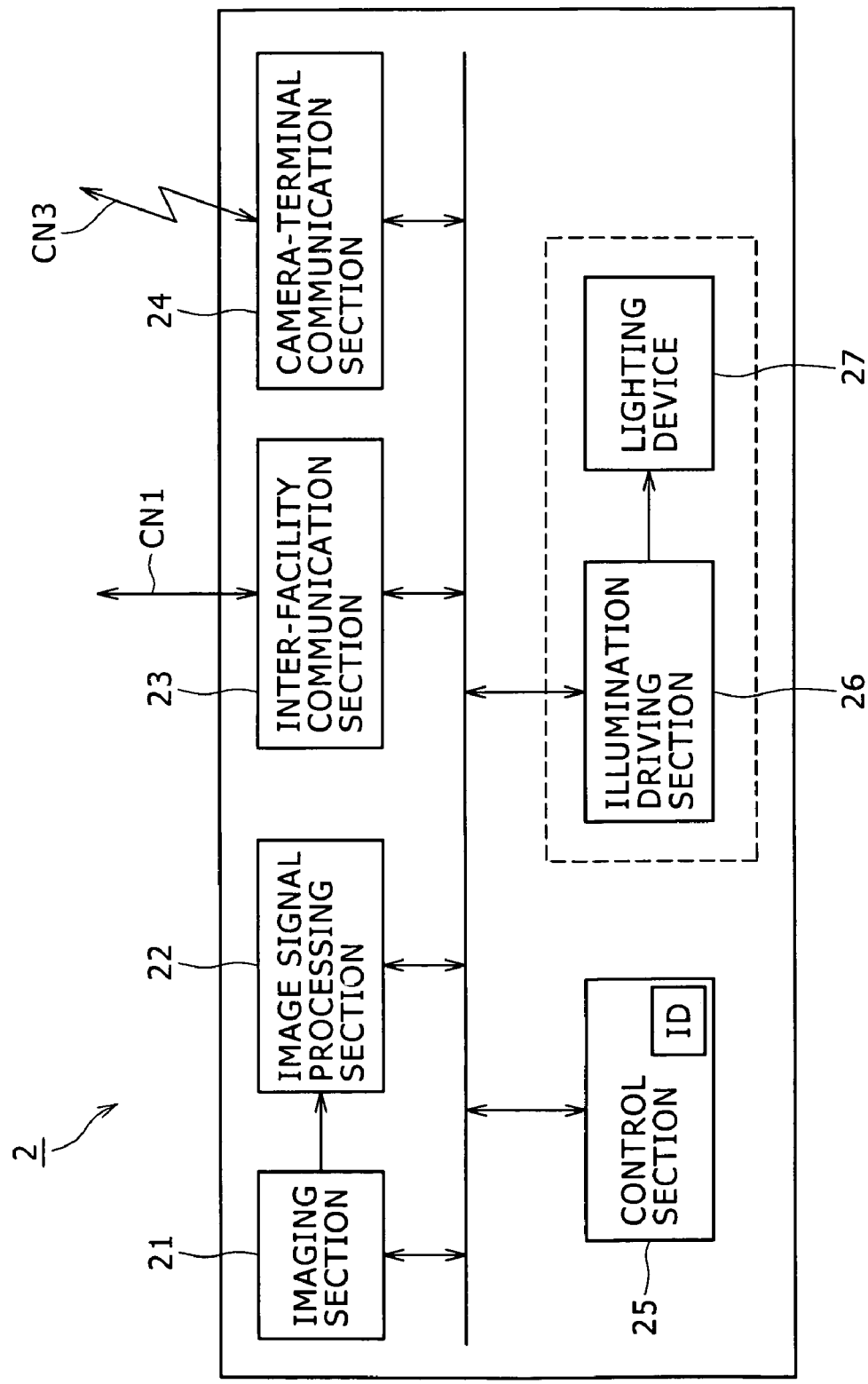
FIG. 3 is a block diagram showing a structural example of a facility camera.

FIG. 3 is a block diagram showing a structural example of the facility camera 2.

The facility camera 2 also includes an imaging section 21 and an image signal processing section 22. Also in this case, the imaging section 21 includes an optical system for imaging and image pickup devices such as a CCD and a CMOS sensor. Photographic image light obtained from the optical system is converted to an electric signal by the image pickup device and output to the image signal processing section 22.

In the image signal processing section 22, the electric signal of the input photographic image light is subjected to predetermined processing such as gain correction and converted to a digital signal. After that, digital image signal processing including predetermined encoding is performed on the signal. A photographic image is generated as a digital image data file in a predetermined format by encoding.

An intra-facility communication section 23 is a part including hardware for enabling communications through the intra-facility network CN1. A camera-terminal communication section 24 is a part for enabling communications through the camera-terminal network CN3. Through the camera-terminal network CN3, wireless communications should be conducted between the facility camera 2 and the portable terminal according to directivity and a distance which correspond to the imaging area Sar. Thus in the intra-facility communication section 23, directivity and radio field intensity or the like are set for enabling wireless communications limited by directivity corresponding to the imaging area Sar and a distance within a fixed range corresponding to the imaging area Sar.

A control section 25 is configured as, for example, a microcomputer which includes a CPU (Central Processing Unit), ROM and RAM and performs kinds of control processing in the facility camera 2.

It is assumed that each of the facility cameras 2 is also provided with a unique ID (camera ID). The camera IDs are stored in internal ROM, so that the terminal IDs are stored in the control section 25.

An illumination driving section 26 and a lighting device 27 are included in the facility camera 2 in the case where, as explained with FIG. 1, the position of the imaging area Sar is indicated by means of illumination acting as guidance to the imaging area Sar.

The illumination driving section 26 drives the lighting device 27 so as to turn on/off light according to the control of the control section 25.

Figure 4:
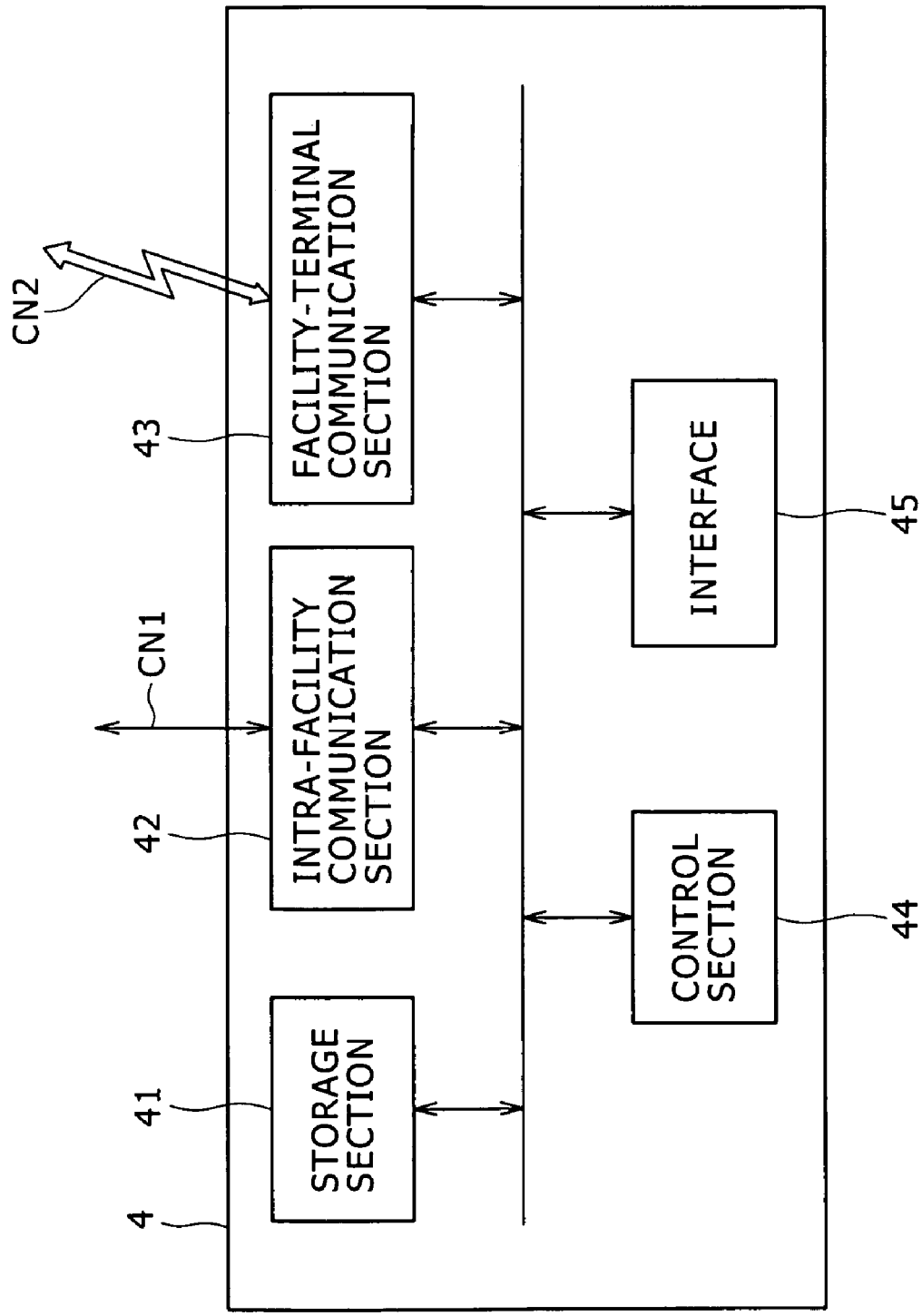
FIG. 4 is a block diagram showing a structural example of a server.

FIG. 4 is a block diagram showing a structural example of the server 4.

In this case, a storage section 41 has a relatively large capacity because it is necessary to store, for a predetermined period, at least image data files obtained by the imaging operations of the facility cameras in the amusement facility. For example, the storage section 41 may include a storage device such as a HDD at present. Although the storage section 41 is represented as a single block, a plurality of storage devices may be connected in an actual configuration.

The storage section 41 also stores terminal management information for managing the lent portable terminal 1, as will be described later.

An intra-facility communication section 42 includes hardware for enabling communications through the intra-facility network CN1. A facility-terminal communication section 43 includes hardware for enabling communications through the facility-terminal network CN2.

A control section 44 includes a computer made up of a CPU, ROM and RAM, and performs kinds of control processing in the server 4.

An interface 45 includes hardware for transferring data to, for example, the register 5 and the image output device 6 which are connected to the server 4 in the management center 3.

FIG. 5A schematically shows a structural example of terminal management information stored in the storage section 41 of the server 4.

The terminal management information is a collection of information (terminal information) in which a group ID, user information, and file link information are associated with one another for each of the terminal IDs of the portable terminals 1. The terminal ID is a unique ID (identifier) designated for each of the portable terminals 1. The group ID is a unique ID assigned, according to a predetermined rule, to each group made up of the portable terminals 1 having the terminal IDs. In FIG. 1, portable terminals 1-1, 1-2, and 1-3 form one group and a single group ID is assigned to the group. The user information is formed by storing, in a predetermined structure, necessary information on the user (guest) who carries the portable terminal 1 of the corresponding ID. Information items making up the user information include, for example, the name, the date of birth, and the age of the user.

As shown in FIG. 5(b), the file link information is formed by storing the file IDs of image data files whose registration for storage has been requested from the portable terminals 1 of the corresponding terminal IDs.

The terminal information including the terminal ID, the group ID, the user information, and the file link information is newly registered in the terminal management information when the portable terminal 1 is lent to the guest and input is performed for registration by the register 5.

Figure 6:
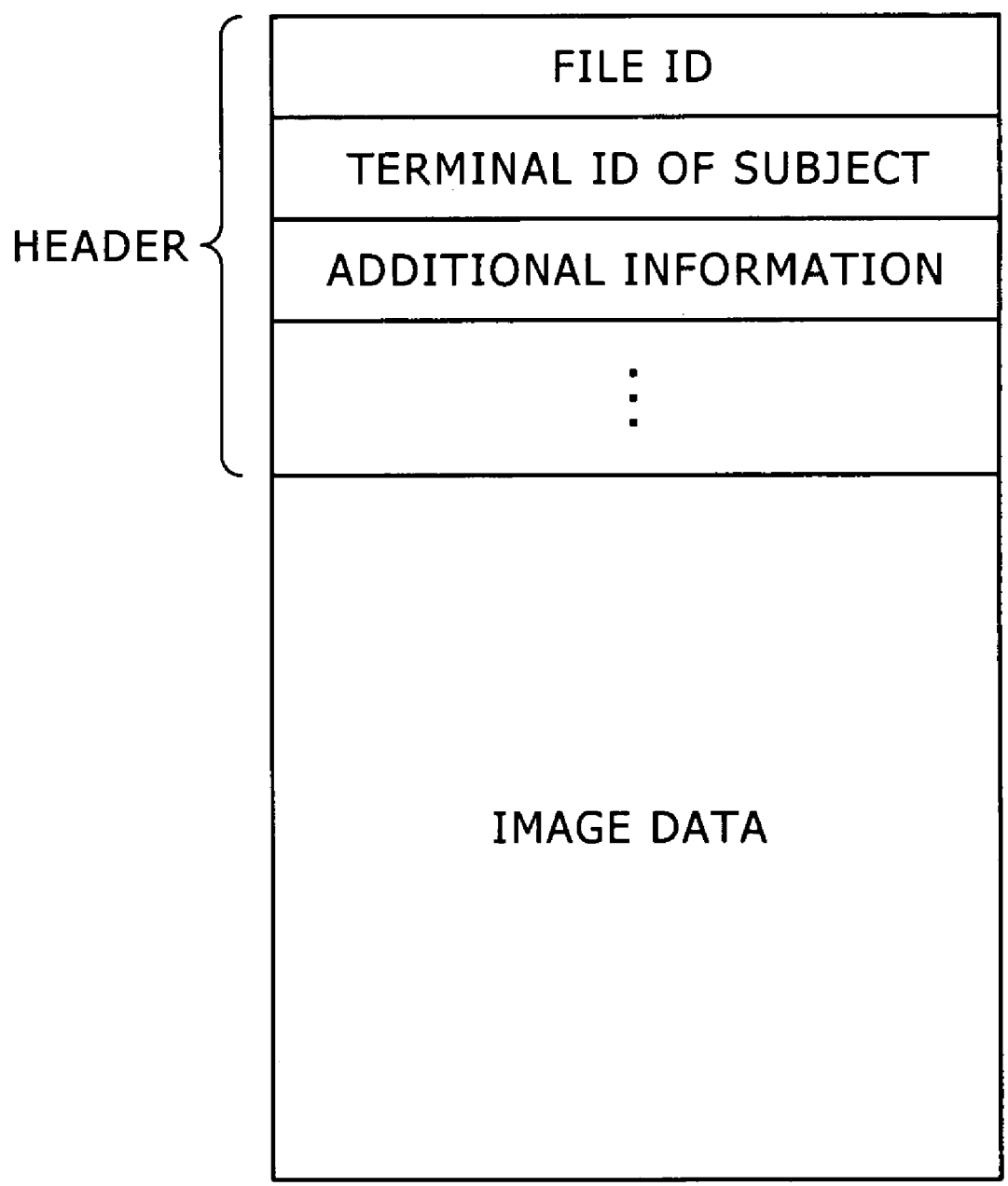
FIG. 6 is a diagram schematically showing a structural example of an image data file.

FIG. 6 shows a structural example of the image data file. For confirmation, the image data file is generated by the imaging operation of the facility camera 2. As shown in FIG. 6, the image data file includes, for example, a header and image data (photographic image data) which follows the header and serves as actual data.

In this case, the header is formed by storing a file ID, the terminal ID of a subject, and kinds of additional information in a predetermined structure.

The file ID is a unique identifier assigned to each file. In the present embodiment, the file ID is generated when the facility camera 2 generates the image data file, and thus it is necessary to avoid overlaps between file IDs generated for the plurality of facility cameras 2. For this purpose, for example, the file ID may include a unique value such as a camera ID for each of the facility cameras 2.

The terminal ID of a subject is the terminal ID of the portable terminal 1 which is enabled to communicate with the facility camera 2 when imaging is performed to generate the current image data file.

The additional information is kinds of necessary information including, for example, the date and time of the creation of the file, the format of the image data, and a file size.

The image data is photographic image data which is obtained based on a photographic image when imaging is performed to generate the current image data file.

Figure 7:
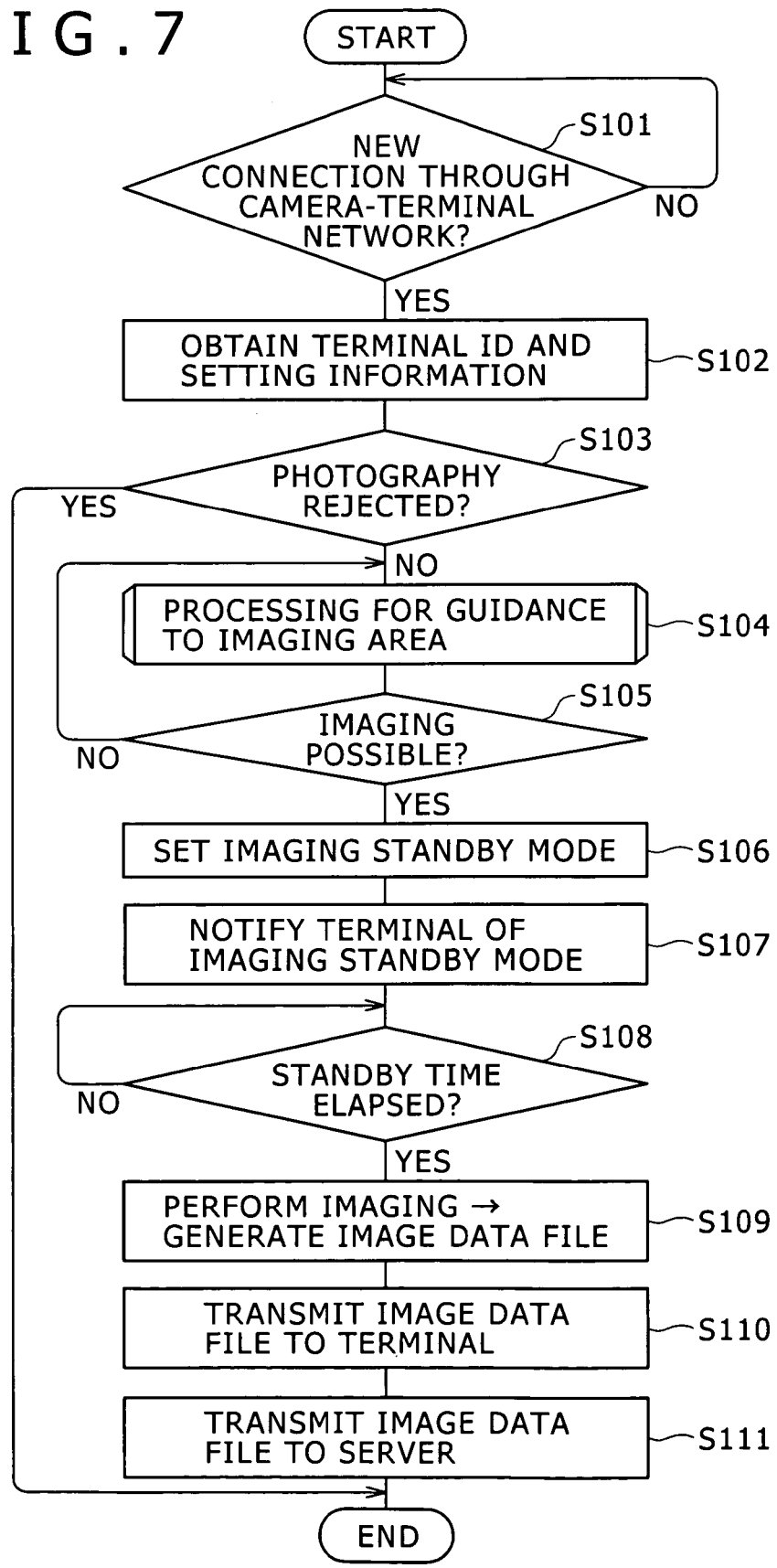
FIG. 7 is a flowchart showing processing for the photographing operation of the facility camera.

FIG. 7 is a flowchart showing processing for implementing operations to be performed by the facility camera 2. The processing of FIG. 7 can be obtained when, for example, the control section 25 of the facility camera 2 runs a program stored so as to be installed in internal ROM.

First, as shown in step S101, the facility camera 2 stands by new establishment of connection with the portable terminal 1 through the camera-terminal network CN3. As explained with FIG. 1, when the guest enters a communication range corresponding to the imaging area Sar while carrying the portable terminal 1, processing is performed to establish communications between the camera-terminal communication section 24 of the facility camera 2 and the camera-terminal communication section 14 of the portable terminal 1. Accordingly a positive decision result is obtained in step S101 and the process advances to step S102.

In step S102, processing is performed to obtain the terminal ID of the portable terminal 1 where communications are established and obtain necessary setting information. For this processing, the facility camera 2 transmits a command from the camera-terminal communication section 24 to the portable terminal 1 to request the transmission of the terminal ID and the setting information.

Figure 8:
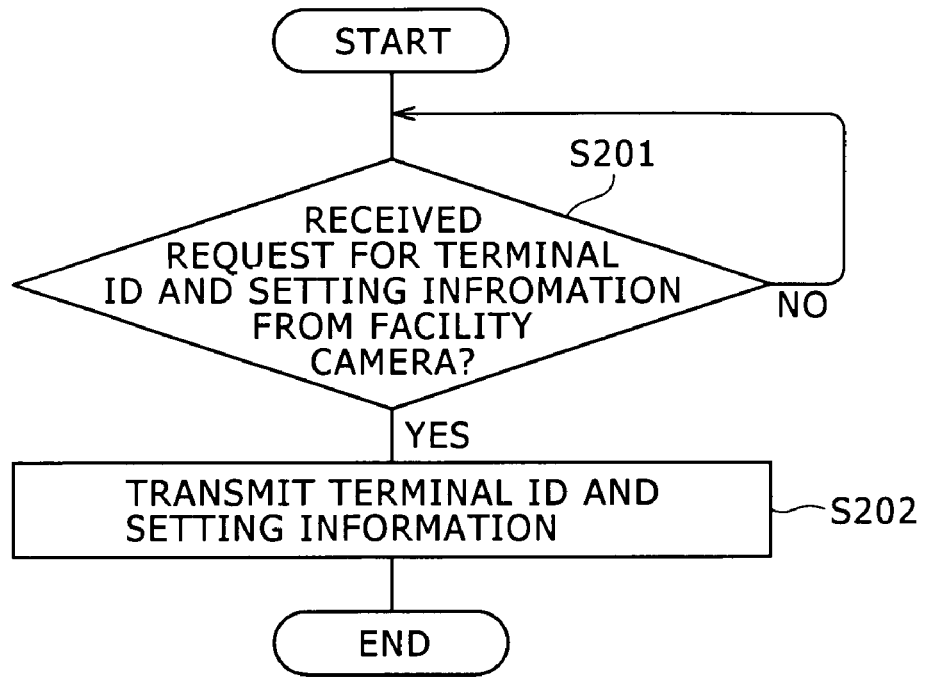
FIG. 8 is a flowchart showing the processing of the portable terminal in response to an operation (information request) of the facility camera.

The flowchart of FIG. 8 shows processing performed by the portable terminal 1 in response to the transmission of the command. The processing of FIG. 8 is also achieved when the control section 15 of the portable terminal 1 runs the program stored in the internal ROM.

In FIG. 8, first in step S201, the portable terminal 1 stands by the reception of the command which is transmitted from the facility camera 2 to request the transmission of the terminal ID and the setting information. When the command is received by the camera-terminal communication section 14 and transferred to the control section 15 through, for example, the data bus, the processing of step S202 is performed. In other words, in response to the command, control is performed to transmit the terminal ID and the setting information from the camera-terminal communication section 14. The terminal ID and setting information having been transmitted thus are received by the facility camera 2, so that the processing of step S102 of FIG. 7 is completed.

In this case, the setting information obtained in the processing of step S102 includes photography permission/prohibition information for setting whether the photographing (imaging) of the facility camera 2 should be accepted or rejected. The contents of the photography permission/prohibition information can be set in response to an operation for permitting/prohibiting photography. The operation is performed by the guest on the portable terminal 1.

Thus in the next step S103, it is decided whether photography is rejected or not with reference to the photography permission/prohibition information of the setting information having been obtained in step S102. In the case of a positive decision result that photography is rejected, the processing is completed. In the case of a negative decision result that photography is permitted, the process advances to step S104.

In step S104, processing for guidance to the imaging area Sar is performed when necessary.

In the explanation of FIG. 1, some examples were discussed about the system operation for properly guiding the guest to the imaging area Sar. The processing of step S104 varies with the guiding operation.

For example, in the case where a standing position in the imaging area Sar is illuminated by the lighting device, the control section 15 controls the illumination driving section 26 to turn on the lighting device 27.

Further, in the case where the portable terminal 1 guides the guest by means of a sound, the LED, the vibrator, and so on, the facility camera 2 controls the portable terminal 1 in step S104 such that guidance is performed on the portable terminal 1. For this processing, for example, a received field intensity is detected by the camera-terminal communication section 24 in the facility camera 2. With the received field intensity, the portable terminal 1 currently communicating with the facility camera 2 is associated with a distance from the imaging area Sar. Then, the time interval between output electronic sounds, the time interval between the blinks of the LED, the time interval between the vibrations of the vibrator and so on are set according to the detected received field intensity, and a command is transmitted from the camera-terminal communication section 24 to output an electronic sound or drive the LED 20b or the vibrator 20a according to the set time interval. The portable terminal 1 controls the sound output section 18, the notifying function section 20 (the vibrator 20a, the LED 20b) and so on in response to the command, so that a predetermined operation for guidance is performed by the portable terminal 1.

Alternatively, a distance to the imaging area Sar is estimated according to the received field intensity having been detected by the facility camera 2, and the portable terminal 1 is notified of the estimated distance and instructed to display the distance. The portable terminal 1 displays the distance to the imaging area Sar in a predetermined display mode by using notified distance information.

Alternatively, data on an image (monitor image) currently imaged by the facility camera 2 is transmitted to the portable terminal 1 through the camera-terminal network CN3. The portable terminal 1 decodes the transmitted data about the monitor image and displays the data as a guidance image on the display section 17.

While the processing of step S104 is performed, the facility camera 2 stands by in step S105 for a state in which the portable terminal 1 enters a communications radius corresponding to the imaging area Sar and the guest who carries the portable terminal 1 can be imaged as a subject. When a positive decision result that the portable terminal 1 enters the communications radius corresponding to the imaging area Sar is obtained in step S105, the process advances to step S106 and later.

In step S106, an imaging standby mode is set. For example, after a fixed time since the imaging standby mode is set, the imaging operation of the facility camera 2 is performed. When the imaging standby mode is set in step S106, the portable terminal 1 is notified of the start of the imaging standby mode through the camera-terminal network CN3, which is indicated in the processing of the next step S107.

Figure 9:
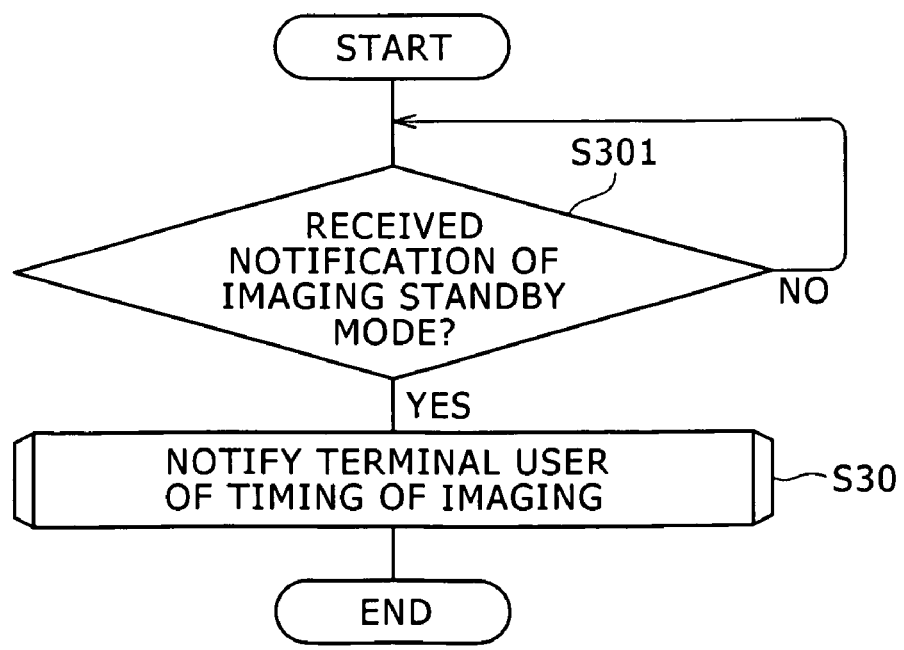
FIG. 9 is a flowchart showing the processing of the portable terminal in response to an operation (notification of imaging standby mode) of the facility camera.

FIG. 9 shows processing performed by the portable terminal 1 in response to the notification of step S107.

In FIG. 9, first in step S301, the portable terminal 1 stands by the reception of the notification of the imaging standby mode. When it is decided that the notification has been received, the process advances to step S302.

In step S302, necessary processing is performed to notify the user (guest) of the time of imaging through the portable terminal 1.

As in the processing of step S104, the processing of step S302 varies with the notification of the time of imaging. For example, it is assumed that the notification of the imaging standby mode is received when the imaging standby mode is set in the facility camera 2. When blinking the LED to notify the time of imaging, until the time of imaging, the interval that the LED is caused to blink is shortened by a predetermined time every time a predetermined time elapses. At the time of imaging, the blinking of the LED is stopped.

The explanation returns to FIG. 7.

After the portable terminal 1 is notified of the imaging standby mode in step S107, the facility camera 2 stands by, in step S108, the lapse of a predetermined standby time until the time of imaging in step S108. In an actual operation, the imaging section 21 may be controlled to perform autofocus control, auto exposure control, and so on during the standby time.

When it is decided in step S108 that the standby time has elapsed and the facility camera 2 reaches the time of imaging, the process advances to step S109, the imaging section 21 and the image signal processing section 22 are controlled, the imaging operation is performed by the imaging section 21, and a signal corresponding to a photographic image obtained from the imaging section 21 is processed by the image signal processing section 22 to obtain photographic image data. Then, an image data file is generated by adding a header to the photographic image data having been obtained thus.

In the next step S110, the image data file having been generated in step S109 is transmitted to the portable terminal 1 through the camera-terminal network CN3. Additionally, as indicated in the next step S111, the image data file having been generated in step S109 is also transmitted to the server 4 through the intra-facility network CN1.

In the portable terminal 1 having received the image data file from the facility camera 2 in the processing of step S110, the received image data file is stored in the storage section 16 under the control of the control section 15 such that the file is managed in a predetermined management format.

Figure 10:
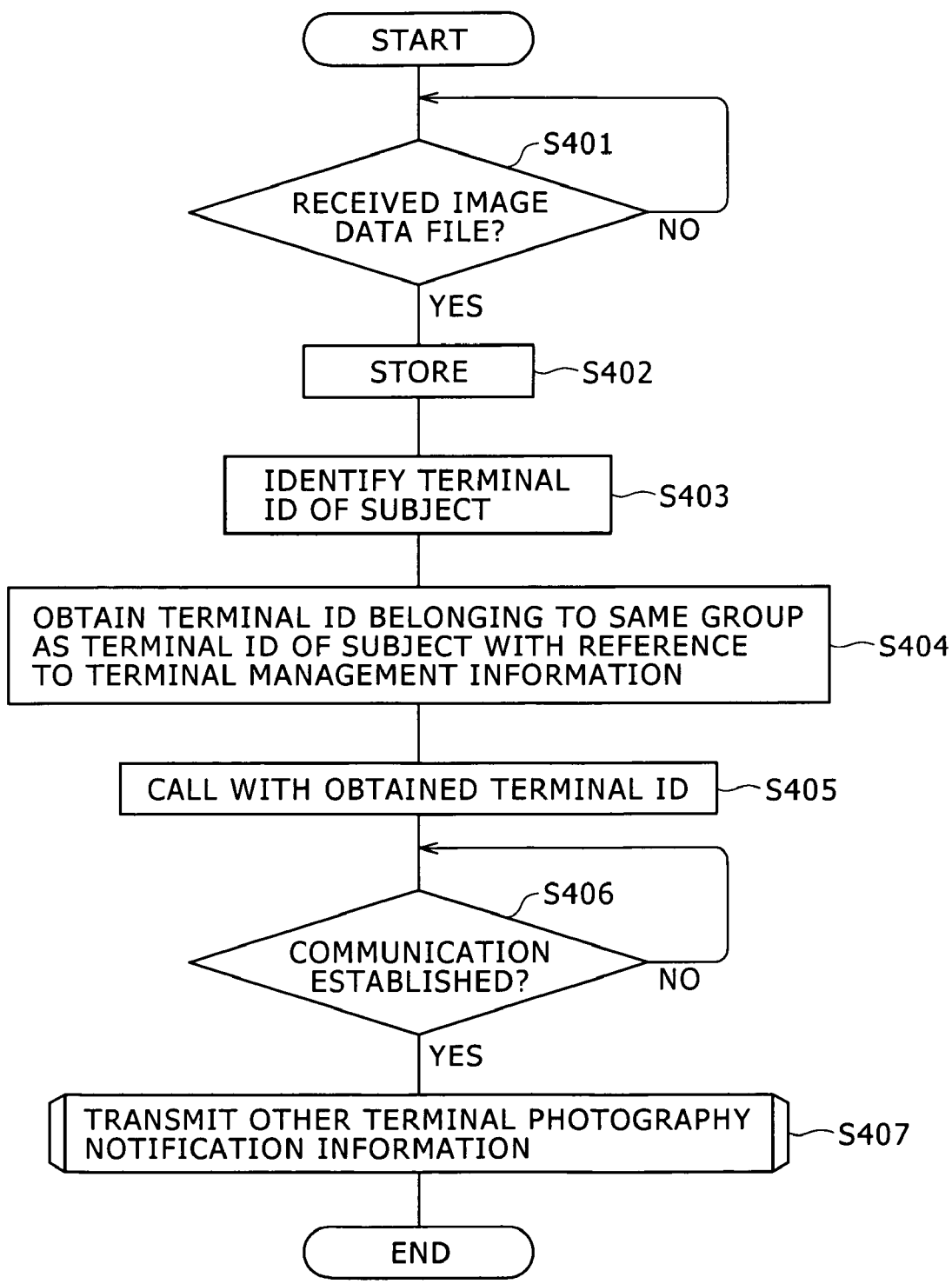
FIG. 10 is a flowchart showing the processing of the server in response to the reception of an image data file from the facility camera.

FIG. 10 shows processing performed by the server 4 in response to the transmission of the image data file from the facility camera 2 in step S111.

In FIG. 10, first in step S401, the server 4 stands by the reception of the image data file which is transmitted from the facility camera 2 in the processing of step S111. In the case of a positive decision result that the image data file is received, the process advances to step S402 and later.

In step S402, the image data file having been received in step S401 is stored in the storage section 41 such that the file is managed in a predetermined management format.

In the next step S403, with reference to the header (FIG. 6) of the image data file having been newly stored in the storage section 41 in step S402, the terminal ID of a subject indicated by the header is recognized.

Figure 5:
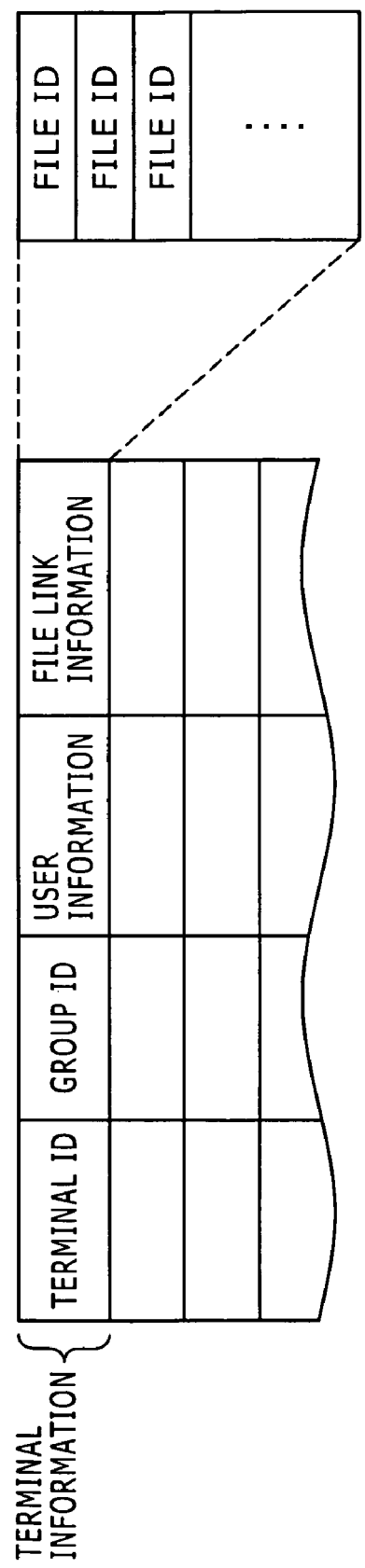
FIG. 5 is a diagram schematically showing a structural example of terminal management information.

Subsequently, in the processing of step S404, a terminal ID belonging to the same group as the terminal ID having been recognized in step S403 is obtained with reference to the terminal management information stored in the storage section 41. For this processing, for example, the terminal management information having the structure of FIG. 5 is searched for terminal information which stores the terminal ID having been recognized in step S403. And then, the terminal management information is searched for another terminal information which stores the same group ID as the group ID stored in the terminal information, and a terminal ID stored in the another terminal information is obtained.

In the next step S405, the facility-terminal communication section 43 is controlled such that the terminal ID having been obtained in step S404 is called through the facility-terminal network CN2.

The portable terminal 1 with the terminal ID having been obtained in step S404 responds to the call of step S405. The portable terminals 1 responding to the call are the portable terminals 1-2 and 1-3 in the explanation of FIG. 1. When the portable terminals 1 respond to the call and a necessary transaction is properly conducted between the portable terminals 1 and the server 4, connection is established between the portable terminals 1 and the server 4 through the facility-terminal network CN2.

In step S406, the server 4 stands by the establishment of connection. When it is decided that the connection is established, the process advances to step S407.

In step S407, other terminal photography notification information is transmitted in response to step S406 to the portable terminal 1 for which the connection is established. The other terminal photography notification information is information for providing notification that a guest (portable terminal 1) in a group has been imaged by the facility camera 2, for the portable terminals 1 carried by the other guests of the same group. In the explanation of FIG. 1, the other terminal photography notification information is information for notifying the portable terminals 1-2 and 1-3 that the portable terminal 1-1 has been photographed (imaged) by the facility camera 2.

In the present embodiment, as discussed in the explanation of FIG. 1, the other portable terminals 1 are notified that one of the portable terminals 1 has been imaged by the facility camera 2, along with the display of a photographic image. Thus in step S407, processing for transmitting the other terminal photography notification information is performed to achieve such a notification pattern.

In this case, the image data file having been received and stored in the storage section 41 in steps S401 and S402 is read and the image data file is included in the structure of the other terminal photography notification information. At this point, the format, structure, and so on of the image data file to be included in the other terminal photography notification information may be changed when necessary. And then, a command for notifying that the portable terminal 1 has been imaged as a subject is stored while the terminal ID (recognized in step S403) of the portable terminal 1 serving as a subject and the image data file or the like are used as operands. The command is included in the structure of the information, so that the other terminal photography notification information is generated.

Figure 11:
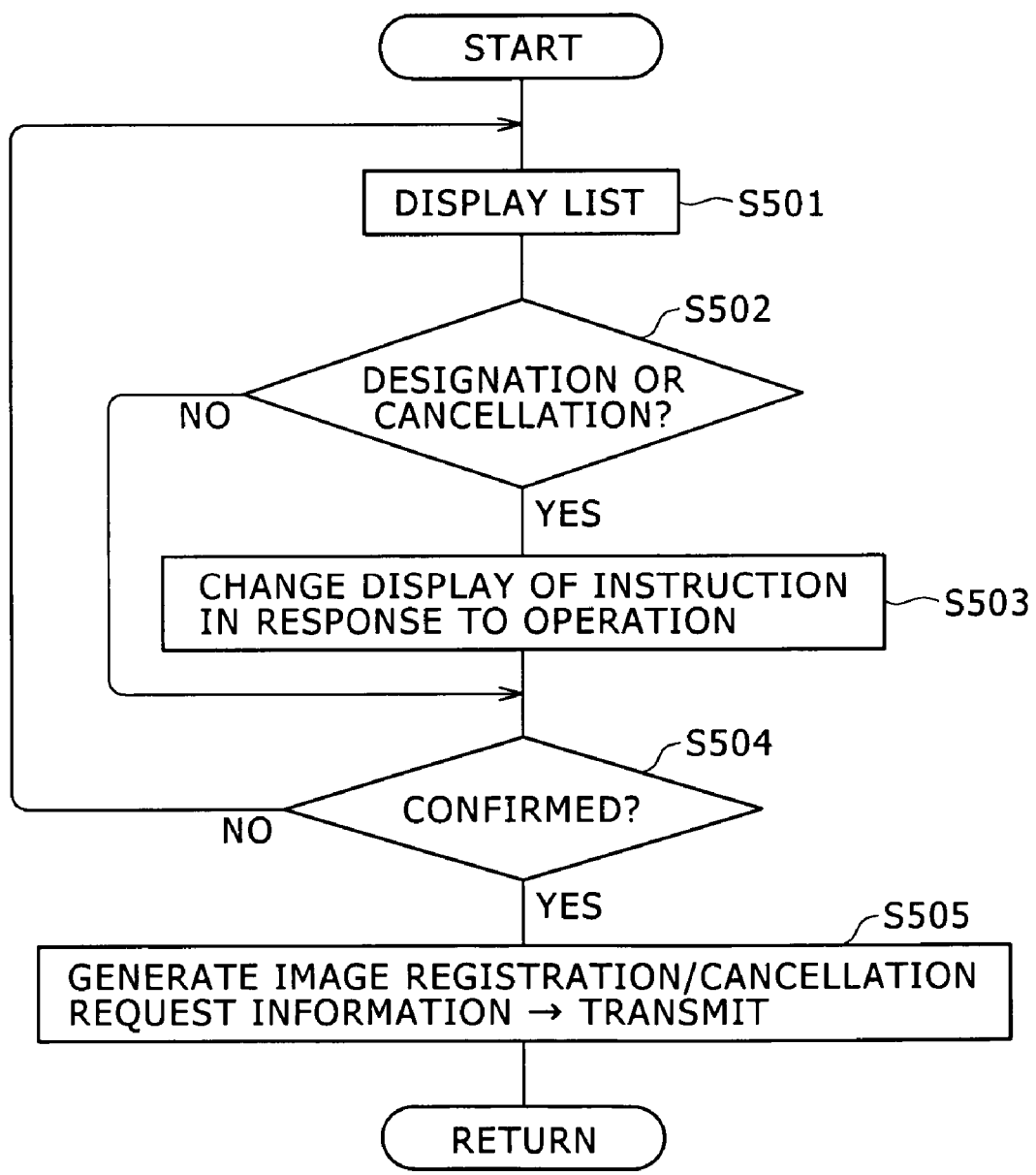
FIG. 11 is a flowchart showing processing for storage and registration/cancellation of the image data file in response to list display on the portable terminal.

The flowchart of FIG. 11 shows processing for designating an image data file for list display or canceling the designation on the portable terminal 1.

For example, when the user (guest) performs a predetermined operation on the operation section 19 to display a list, the control section 15 starts control for displaying the list in step S501.

In the actual processing of step S501, for example, the control section 15 of the portable terminal 1 reads image data files for list display from the storage section 16 and generates thumbnail images of the (photographic) image data of the image data files while using a predetermined signal processing function of the image signal processing section 12 when necessary. Then, the control section 15 generates display image data for list display by using the generated thumbnail images, and controls the display section 17 so as to display images according to the display image data.

In the list display provided thus, as described above, a checkbox or the like is displayed for each thumbnail image, so that a photograph to be included in an album can be designated. In step S502, it is decided whether the designation is performed (for example, a checkbox is marked). Further, it is decided whether the designation is cancelled (for example, a checkbox is unmarked). In short, in step S502, it is decided whether a photograph to be included in an album is designated or whether designation is cancelled.

In the case of a decision result that designation or cancellation has not been performed in step S502, the processing of step S503 is skipped and the process advances to step S504. Conversely in the case of a decision result that designation or cancellation has been performed, the process advances to step S503 to perform display control for changing the display of instructions on the list display such that the display reflects the setting contents having been changed by the designation or cancellation having been performed in step S502. For example, when it is decided in step S502 that a checkbox corresponding to a thumbnail image is marked in the list display, the checkbox is displayed with a mark in step S503. At the completion of the processing of step S503, the process advances to step S504.

In step S504, it is decided whether a predetermined confirming operation for confirming the operation setting contents of the designation or cancellation is performed on the operation section 19. In the case of a negative decision result, the process returns to step S501. In the case of a positive decision result, the process advances to step S505.

In step S505, the setting contents at the confirmation of step S504 and the setting contents at the previous confirmation are compared with each other, and difference information on the setting contents is recognized. And then, information (command) for requesting image registration/cancellation is generated according to the difference information and transmitted to the server 4 through the facility-terminal network CN2.

For example, it is assumed that three image data files A, B and C are designated as photographs to be included in an album in the setting contents of the previous confirmation, whereas image data files A, C and D are designated as photographs to be included in an album in the current setting contents. In this case, difference information that "the registration of the image data file B is cancelled and the image data file D is newly registered" is obtained. Thus, as information for requesting image registration/cancellation, a command for requesting the cancellation of the registration of the image data file B and a command for requesting the new registration of the image data file D are generated according to the difference information. These commands include information for instructing the new registration or cancellation of the image data file and the terminal ID of the portable terminal 1 acting as a source. Further, the commands include the file ID of an image data file to be newly registered or cancelled. Then these commands are transferred to the facility-terminal communication section 13 and transmitted to the server 4 through the facility-terminal network CN2.

When a predetermined operation (not shown) for terminating the list display is performed on the operation section 19, the list display on the display section 17 is terminated and the processing of FIG. 11 is completed.

Figure 12:
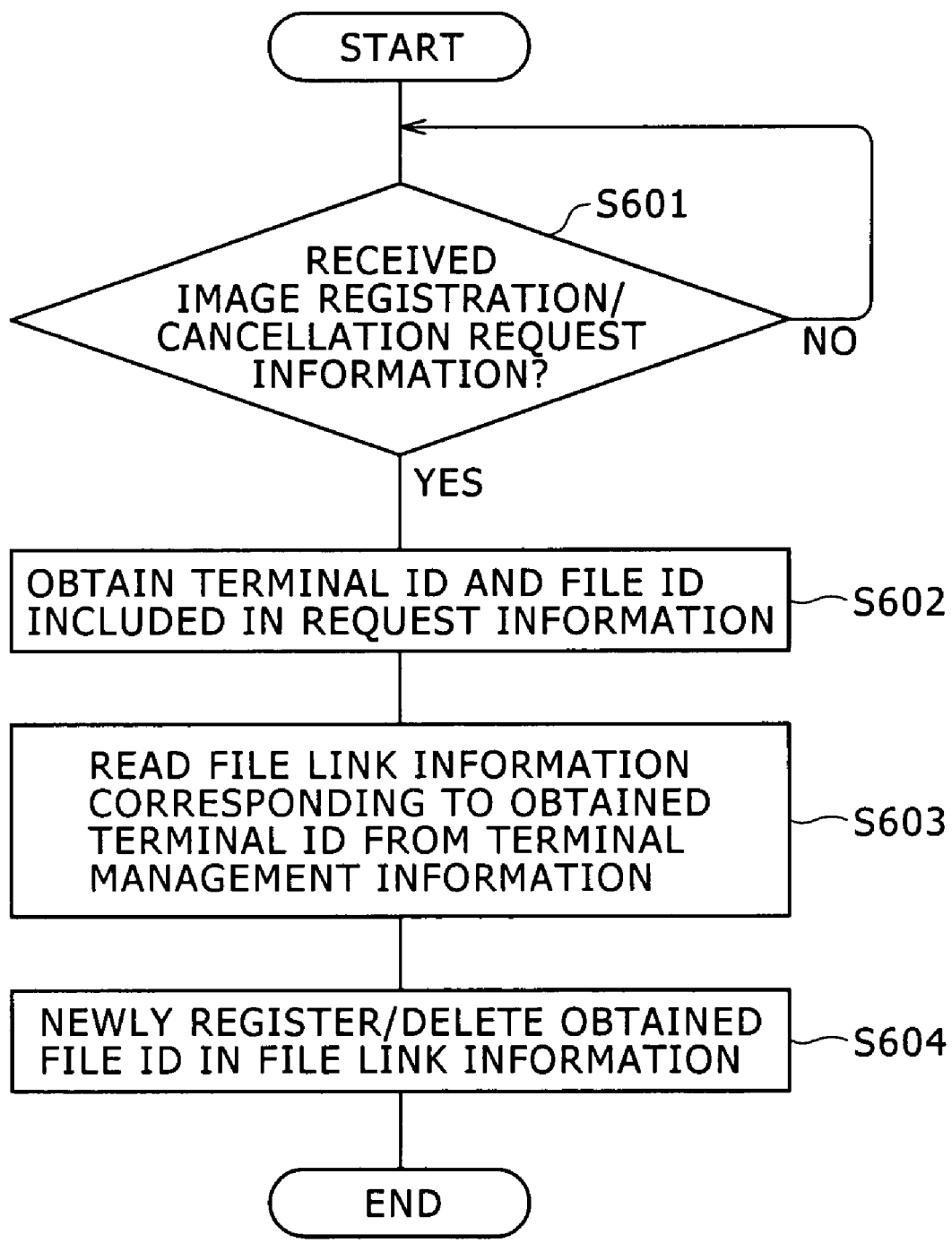
FIG. 12 is a flowchart showing processing of the server in response to an image registration/cancellation request transmitted from the portable terminal.

The flowchart of FIG. 12 shows the processing of the server 4 in response to the image registration/cancellation request information transmitted thus.

In FIG. 12, first in step S601, the server 4 stands by the reception of the image registration/cancellation request information through the facility-terminal network CN2. When the image registration/cancellation request information is received, the process advances to step S602.

In step S602, the terminal ID of the portable terminal 1 of the source and the file ID of a target file of image registration/cancellation are obtained. The terminal ID and the file ID are included in the structure of the received image registration/cancellation request information.

In the next step S603, the terminal management information stored in the storage section 41 is searched for terminal information corresponding to the terminal ID having been obtained in step S602, and file link information stored in the retrieved terminal information is read.

In step S604, the file link information is updated based on the file ID having been obtained in step S602. In other words, when the request information having been received in step S601 instructs registration, edition is performed such that the file ID having been obtained in step S602 is added to the file link information. When the request information having been received in step S601 instructs cancellation of registration, edition is performed such that the file ID having been obtained in step S602 is deleted from the file link information.

When producing an album of photographs taken by the facility camera 2, for example, user information including a name or the ID of the portable terminal carried by the guest who has requested the album is used as a search condition, and terminal information corresponding to the guest is retrieved from the terminal management information. And then, file link information stored in the retrieved terminal information is obtained, and image data files indicated by file IDs registered in the file link information are read and obtained from the storage section 41 of the server 4. Subsequently the album is produced using the image data of the image data files.

The foregoing configuration and operations of the imaging system may be changed as appropriate under the concept of the present invention.

For example, in the system operation described with FIG. 1, the portable terminals 1-2 and 1-3 are notified that the facility camera 2 "has photographed" the portable terminal 1-1 belonging to the same group. Moreover, according to another embodiment of the present invention, the portable terminals 1-2 and 1-3 may be notified that the facility camera 2 "is about to photograph" the portable terminal 1-1 belonging to the same group.

For such notification, for example, in the processing performed by the facility camera 2 in step S107 of FIG. 7, the portable terminal 1 (to be imaged) which can communicate through the camera-terminal network CN3 is notified of the imaging standby mode, and the imaging standby mode is transmitted to the server 4 together with the terminal ID of the portable terminal 1 to be imaged. In response to the notification, a notification that the portable terminal 1 to be imaged "is about to be imaged" is provided from the server 4 through the facility-terminal network CN2 to the portable terminals 1 belonging to the same group as the terminal ID having been received with the notification. At this moment, for example, a monitor image is transmitted from the facility camera 2 to the server 4 and the monitor image is transmitted from the server 4 to the portable terminals 1 other than the portable terminal 1 to be imaged. Thus on the notified portable terminals 1, a state of the guest who is about to be imaged can be viewed as a monitor image, thereby increasing entertainment.

For example, the portable terminal 1 of the present embodiment has the imaging function. Thus image data files obtained by the imaging operation of the portable terminal 1 may be also transmitted to the server 4 and stored and managed therein. For example, the image data files may be included in the photographs of an album.

Since the portable terminal 1 of the present embodiment corresponds to the terminal of the present invention, the imaging function may not be necessary. In short, the imaging function may be omitted in the portable terminal 1.

Figure 13:
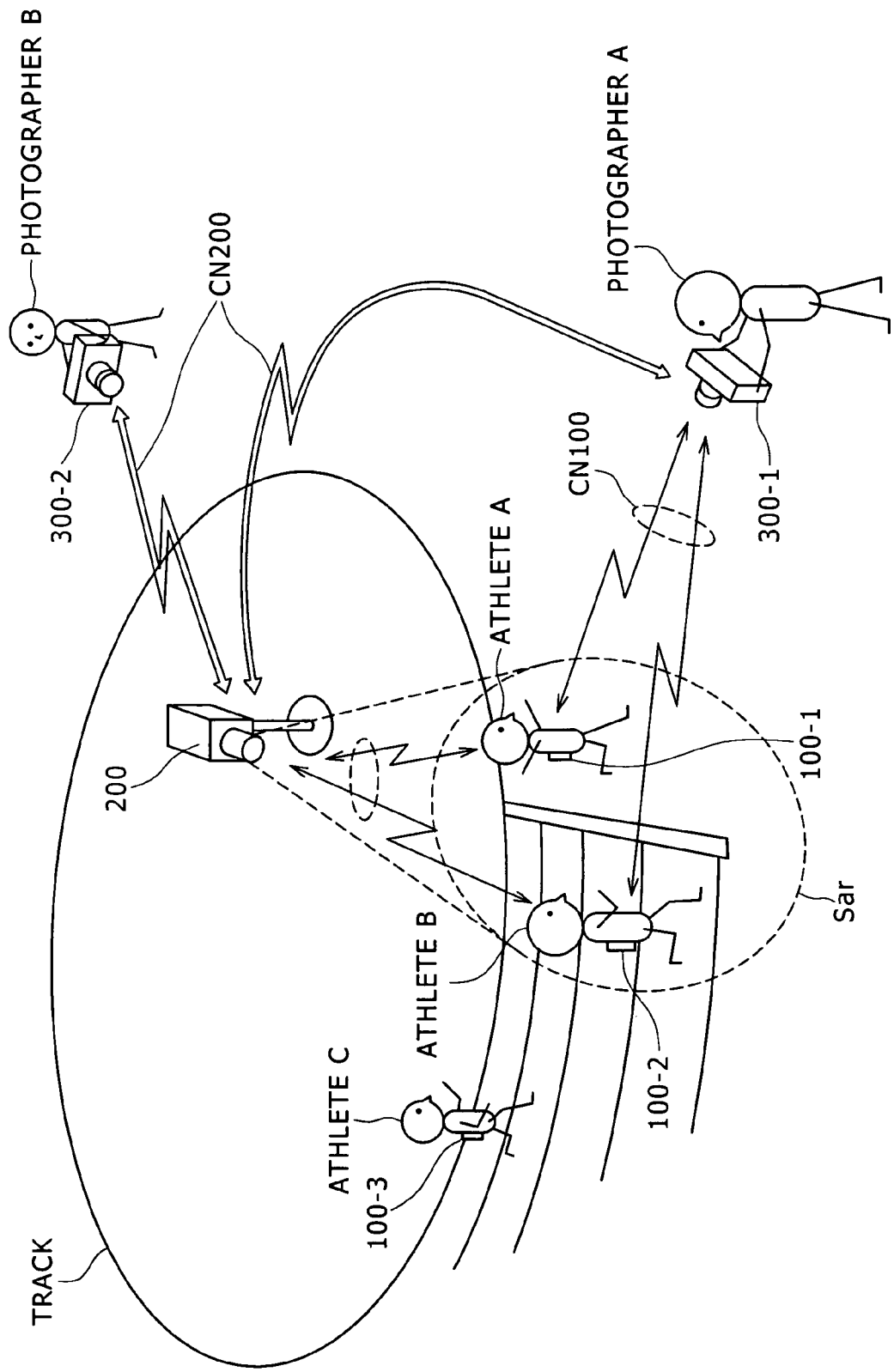
FIG. 13 is a diagram conceptually showing another example of the imaging system according to an embodiment of the present invention.

FIG. 13 shows another example of the system configuration based on the concept of the present invention.

The system configuration of FIG. 13 is configured for the case where track and field events are held on a field day, an athletic meet, and so on. The configuration mainly includes athlete terminals 100 (100-1, 100-2, and 100-3), a stationary camera 200, and mobile cameras 300. The athlete terminal 100 is attached to the clothes or the like of an athlete. In this case, for example, a so-called IC tag having the minimum size and weight is preferable because the IC tag does not interfere with the motion of the athlete. In FIG. 13, athletes A, B and C compete on a circuit track and have the athlete terminals 100-1, 100-2, and 100-3, respectively.

The stationary camera 200 is an imaging device which is placed in a fixed manner in the athletic field (or may be movably placed on rails or the like). In this case, regarding the imaging field of view, a fixed range including the finish line corresponds to the imaging area Sar.

The mobile camera 300 is, for example, an imaging device carried by a spectator.

The following will discuss the basic operations of the system.

In the basic operations, the terminal of the present invention is the athlete terminal 100 and the mobile camera 300. Further, the imaging device of the present invention is the stationary camera 200. Moreover, the managing device of the present invention is the stationary camera 200. In other words, in FIG. 13, the function of the imaging device and the function of the managing device are implemented by the same device. In this case, third communication means (the intra-facility network CN1 of FIG. 1) for wireless communications between the imaging device and the managing device may be substantially omitted. In this configuration, the third communication means is an internal interface which acts as hardware or software in the stationary camera 200 when interfacing between the function of the imaging device and the function of the managing device.

In FIG. 13, it is assumed that the athlete terminal 100-1 and the mobile camera 300-1 form one group. Further, the athlete terminal 100-2 and the mobile camera 300-2 form one group. In this case, the terminals (the athlete terminal 100, the stationary camera 200) are managed in groups by the stationary camera 200. Information with a predetermined structure for group management is stored in the stationary camera 200. In the example of FIG. 1, the terminal management information of FIG. 5 corresponds to the information.

In the basic operations, a camera-terminal network CN100 functions which enables communications between the stationary camera 200 and the athlete terminal 100 and an inter-camera network CN200 functions which enables communications between the stationary camera 200 and the mobile camera 300.

The camera-terminal network CN100 is a network equivalent to first communication means of the present invention and corresponds to the camera-terminal network CN3 of the example of FIG. 1. The inter-camera network CN200 is a network equivalent to second communication means of the present invention and corresponds to the facility-terminal network CN2 of the example of FIG. 1.

As described above, the network (the intra-facility network CN1 of FIG. 1) corresponding to third communication means of the present invention is included in the stationary camera 200 acting as the imaging device and the managing device.

In this case, the communication range of the camera-terminal network CN100 of the stationary camera 200 includes directivity and a distance range around the finish line. Thus when the athletes of the field and track run close to the finish line, the athlete terminals 100 of the athletes and the stationary camera 200 can communicate with each other. In FIG. 13, of the athletes A, B and C, the athletes A and B run close to the finish line, and thus the athlete terminals 100-1 and 100-2 of the athletes A and B and the stationary camera 200 can communicate with each other.

In the example of FIG. 13, when the stationary camera 200 decides that communications with the athlete terminal 100 are enabled thus through the camera-terminal network CN100, the stationary camera 200 thereafter performs an imaging operation at a predetermined time. Therefore in this case, the athletes crossing the finish line are imaged. In FIG. 13, the athletes A and B running close to the finish line are imaged.

Subsequently, in response to the imaging operation, the stationary camera 200 identifies the mobile camera 300 belonging to the same group as the athlete terminal 100 with which communications are enabled through the camera-terminal network CN100. For this processing, in response to the imaging operation, the stationary camera 200 acquires a terminal ID from the athlete terminal 100 with which communications are enabled through the camera-terminal network CN100. And then, from group management information stored in the stationary camera 200, the stationary camera 200 identifies the ID of the mobile camera 300 (mobile camera ID) belonging to the same group as the acquired terminal ID.

Subsequently, the stationary camera 200 transmits photographic image data (image data file) obtained by imaging to the mobile camera whose ID has been identified thus, through the inter-camera network CN200.

In the mobile camera 300 having received the transmitted photographic image data, the image of the received photographic image data is displayed and stored. In FIG. 13, photographic image data obtained by the imaging operation of the stationary camera 200 is transmitted to the mobile camera 300-1 belonging to the same group as the athlete terminal 100-1 and the mobile camera 300-2 belonging to the same group as the athlete terminal 100-2.

Such a system operation has the following advantage.

In this case, the stationary camera 200 photographs the vicinity of the finish line from the inside of the track. A photographer carrying the mobile camera 300 outside the track cannot photograph the athlete in such a composition. However, in the above system operation, an image taken by the stationary camera 200 is obtained in the mobile camera 300. Additionally, photographic image data is not indiscriminately transmitted from the stationary camera 200 and only photographic image data of the athlete terminal 100 belonging to the same group as the mobile camera 300 is obtained. To be specific, for example, when an athlete carrying the athlete terminal 100 of the same group is a child and a photographer carrying the mobile camera 300 is a parent of the child, photographic image data is transmitted to the mobile camera 300 of the photographer who is the parent of the child only at a moment when the child is imaged by the mobile camera 300. Thus unnecessary photographic image data on other children is not transmitted to the mobile camera 300.

Also in the above system operation, from the time the stationary camera 200 and the athlete terminal 100 can communicate with each other until the time the imaging operation is performed, the mobile camera 300 may be notified that the stationary camera 200 is about to image the athlete. The notification is provided by, for example, transmitting a monitor image of the stationary camera 200.

In the system of FIG. 13, the following system operation is also available:

In the specific explanation of the system operation, the terminal of the present invention corresponds to the athlete terminal which can be a subject terminal. The mobile camera 300-1 carried by the photographer A corresponds to the imaging device of the present invention. Further, the mobile camera 300-2 carried by the photographer B corresponds to the non-subject terminal of the present invention. In other words, in this case, the mobile camera 300 acts as the imaging device or the non-subject terminal of the present invention according to the circumstances. The stationary camera 200 corresponds to, in this case, the managing device of the present invention and the imaging function is not particularly used. Therefore a special server may be provided instead of the stationary camera 200.

Moreover, the mobile camera 300 of this case has the function of the imaging device according to the embodiment of the present invention, and thus the mobile camera 300 is configured such that short range wireless communications are conducted with directivity with the athlete terminals 100 through the camera-terminal network CN100. In this case, the directivity of the communications with the mobile camera 300 through the camera-terminal network CN100 corresponds to the imaging field of view of the mobile camera 300.

It is assumed that the photographer A stays around the finish line so as to photograph athletes running to the finish line in a preferable composition. Further, it is assumed that a child of the photographer A is the athlete A and the mobile camera 300-1 carried by the photographer A and the athlete terminal 100-1 of the athlete A are managed in the same group by the stationary camera 200. Moreover, it is assumed that a child of the photographer B is the athlete B and the mobile camera 300-2 carried by the photographer B and the athlete terminal 100-2 of the athlete B are managed in the same group by the stationary camera 200.

In this state, the photographer A prepares for photographing when the athlete A, the child of the photographer A, runs close to the finish line ahead of the other athletes. At this moment, the mobile camera 300-1 has its imaging field of view around the finish line. Further, it is assumed that photographing is performed just when the athlete A crosses the finish line. Moreover, it is assumed that the athlete B in the second place runs slightly behind the athlete A.

In this state, at a moment when the photographer performs photographing, the mobile camera 300-1 can communicate with the athlete terminal 100-2 of the athlete B as well as the athlete terminal 100-1 of the athlete A through the camera-terminal network CN100. This means that the imaging field of view of the mobile camera 300-1 includes not only the athlete A (athlete terminal 100-1) but also the athlete B (athlete terminal 100-2). Further, it is assumed that the mobile camera 300-1 at this moment obtains the terminal ID of the athlete terminal 100-2 in addition to the terminal ID of the athlete terminal 100-1.

The mobile camera 300-1 having performed imaging thus generates, as the facility camera 2 of FIG. 1, an image data file including photographic image data. Then, the mobile camera 300-1 stores the image data file in the storage section of the mobile camera 300-1 and transmits the image data file to the stationary camera 200, which acts as a server, through the inter-camera network CN200. The header of the image data file stores the two terminal IDs of the athlete terminals 100-1 and 100-2 as the terminal IDs of subjects. In this case, the image data file also stores the ID of the mobile camera 300 (mobile camera ID) having generated the file.

The stationary camera 200 having received the image data file identifies, with reference to group management information stored in the stationary camera 200, the mobile camera IDs of the mobile cameras 300 belonging to the same group as the terminal ID of the subject, the terminal ID being stored in the header of the received image data file. Although mobile camera IDs identified thus also include the mobile camera ID of the mobile camera 300 having generated the image data file, the mobile camera ID is excluded.

And then, the stationary camera 200 notifies the mobile camera whose ID identified thus that the imaging operation has been performed by the mobile camera 300-1. In this notification, the image data file having been transmitted from the mobile camera 300-1 is transmitted to the mobile camera at the destination, for example, in a transferred manner.

As a result of this operation, in FIG. 13, the image data file is transmitted to the mobile camera 300-2 which is managed as the same group as the athlete terminal 100-2.

When viewed from the photographer B, an image taken by the photographer A with the mobile camera 300-1 is transmitted to the photographer B. When the image of the transmitted image data file is displayed, the photographer B views the athlete B who is the child of the photographer B. In other words, in this system operation, even when a photographer does not photograph an athlete of the same group, an image photographed by another person is transferred and obtained by the photographer. For example, in the state of FIG. 13, the photographer B is far away from the finish line and thus cannot photograph the child (athlete B) running close to the finish line. However, since an image photographed by the photographer A is obtained thus; the photographer B can obtain an image of the child crossing the finish line even when the photographer B is far away from the finish line.

Therefore, also in the example of FIG. 13, the system operation is implemented under the technical concept that a non-subject terminal other than a subject terminal of the same group is notified that the subject terminal is about to be photographed or has been photographed, so that a photographer can obtain a photographic image which has been difficult to obtain by himself/herself in the past.

The system operation described with FIG. 13 can be implemented based on the technical configuration for implementing the system operation described with FIG. 1, and thus the explanation thereof is omitted.

The present invention is not limited to the foregoing system configurations and algorithms or the like and can be properly changed according to actual application.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging system, comprising:
   a plurality of terminals respectively provided to a corresponding plurality of moving subjects;
   an imaging device; and
   a managing device, including:
   managing means that manages the plurality of terminals as a group,
   first communication means that conducts wireless communication between the imaging device and at least a subject terminal of the plurality of terminals in the group, the subject terminal being within a coverage area of short range physical communication,
   second communication means that conducts wireless communication between the subject terminal and the managing device,
   third communication means that conducts wireless communication between the imaging device and the managing device,
   imaging means that performs an imaging operation associated with the subject terminal by which the imaging device obtains photographic image data in an imaging field of view of the imaging device while the subject terminal is within the coverage area of the first communication means and communication is enabled between the imaging device and the subject terminal through the first communication means, and
   notifying means that provides notification through both the subject terminal and a non-subject terminal of the plurality of terminals in the group that the imaging means is about to perform the imaging operation associated with the subject terminal, the non-subject terminal being located outside of the imaging field of view of the imaging device.

2. The imaging system according to claim 1, further comprising:
   image transmitting means that transmits, to the subject terminal and to the non-subject terminal, through necessary ones of the first communication means, the second communication means, and the third communication means, the photographic image data obtained by the imaging operation of the imaging means as at least a part of a further notification that the imaging means has performed the imaging operation associated with the subject terminal; and
   display output means that causes display of the received photographic image data in the subject terminal and in the non-subject terminal.

3. The imaging system according to claim 1, wherein the notifying means provides, when providing the notification that the imaging operation is about to be performed, notification of a time of imaging.

4. The imaging system according to claim 1, wherein the notifying means that issues the notification through the non-subject terminal includes:
- first notification information communication means that transfers notification information from the imaging device to the managing device through the third communication means;
- second notification information communication means that transfers the notification information from the managing device to the non-subject terminal through the second communication means, the managing device having received information equivalent to the notification through the first information notification means; and
- notification output means that outputs the notification in a predetermined mode in the non-subject terminal having received the notification information through the first information notification means.

5. A system control method for an imaging system which includes a plurality of terminals respectively provided to a corresponding plurality of moving subjects, an imaging device, and a managing device, the method comprising:
- managing the plurality of terminals as a group;
- conducting wireless communication between the imaging device and at least a subject terminal of the plurality of terminals in the group, the subject terminal being within a coverage area of short range physical communication;
- conducting wireless communication between the subject terminal and the managing device;
- conducting communication between the imaging device and the managing device;
- providing notification through both the subject terminal and a non-subject terminal of the plurality of terminals in the group that an imaging operation associated with the subject terminal is about to be performed by which the imaging device obtains photographic image data in an imaging field of view of the imaging device while the subject terminal is within the coverage area of short range physical communication and communication is enabled between the imaging device and the subject terminal, the non-subject terminal being located outside of the imaging field of view of the imaging device; and
- performing the imaging operation associated with the subject terminal.

6. The system control method according to claim 5, further comprising:
- transmitting, to the subject terminal and to the non-subject terminal, the photographic image data obtained by the imaging operation of the imaging means as at least a part of a further notification that the imaging means has performed the imaging operation associated with the subject terminal; and
- causing display of the received photographic image data in the subject terminal and in the non-subject terminal.

7. The system control method according to claim 5, wherein notification of a time of imaging is provided when providing the notification that the imaging operation is about to be performed.

8. The system control method according to claim 5, wherein the providing of the notification through the non-subject terminal includes:
- transferring notification information from the imaging device to the managing device,
- transferring the notification information from the managing device to the non-subject terminal, and
- outputting the notification in a predetermined mode in the non-subject terminal.

* * * * *